(12) United States Patent
Chang

(10) Patent No.: US 7,874,874 B2
(45) Date of Patent: Jan. 25, 2011

(54) CONNECTING DEVICE HAVING A BUILD-IN DIGITAL TELEVISION TUNER

(76) Inventor: Nai-Chien Chang, 5F., No.15, Lane 117, Sec. 4, Sanhe Rd., Sanchong City, Taipei County 241 (TW)

( * ) Notice: Subject to any disclaimer, the term of this patent is extended or adjusted under 35 U.S.C. 154(b) by 0 days.

(21) Appl. No.: 12/577,439

(22) Filed: Oct. 12, 2009

(65) Prior Publication Data
US 2010/0159748 A1    Jun. 24, 2010

(30) Foreign Application Priority Data
Dec. 22, 2008    (TW) ............................... 97223007 U

(51) Int. Cl.
*H01R 13/66* (2006.01)
(52) U.S. Cl. ................................. 439/620.01
(58) Field of Classification Search ............ 439/620.01, 439/620.06, 620.15, 620.18, 620.22; 348/725; 725/70, 151
See application file for complete search history.

(56) References Cited

U.S. PATENT DOCUMENTS

| | | | | |
|---|---|---|---|---|
| 7,140,919 B2 * | 11/2006 | Yu | ......................... | 439/620.13 |
| 7,611,382 B2 * | 11/2009 | Cuthbertson | ........... | 439/620.01 |
| 7,628,619 B2 * | 12/2009 | Chuang | ..................... | 439/76.1 |

* cited by examiner

Primary Examiner—Khiem Nguyen
(74) Attorney, Agent, or Firm—Chun-Ming Shih; HDLS IPR Services

(57) ABSTRACT

A connecting device having a built-in digital television tuner includes a base, a digital television tuner, a cover plate and a connector. The base has two ports. One of the two ports is assembled with the digital television tuner. The inner walls of both sides of the port have two symmetrical grooves. Rails provided on both sides of the cover plate are assembled in the grooves, so that the cover plate can slide in the port. The other port of the base is assembled with the connector. When being electrically connected to an electronic device, the connecting device of the present invention allows transmission lines of different functions to be inserted therein and receives digital television signals, whereby a user can watch digital television programs.

10 Claims, 7 Drawing Sheets

CONNECTING DEVICE HAVING A BUILD-IN DIGITAL TELEVISION TUNER

BACKGROUND OF THE INVENTION

1. Field of the Invention

The present invention relates to a connector, and in particular to a connecting device with a function of a digital television tuner.

2. Description of Prior Art

Connectors refer to connecting elements and related accessories for connecting electronic signals and a power source. For example, a connector is used to generate an electrical connection between a computer and its peripheral devices such as a mouse, a display, a keyboard, a printer or the like. On the other hand, a connector is used to generate an electrical connection between respective modules in an apparatus such as an integrated circuit socket, an edge board connector or the like. Therefore, for electronic devices, the connector is a very important component.

Recently, with the advancement of technology, a plenty of new-generation connectors are developed, such as USB, HDMI, Displayport, eSATA, or SATA. Among these connectors, some connectors are capable of reducing the number of transmission lines and increasing the transmission rate. In the past, at least three transmission lines are needed to transmit audio signals and images. However, nowadays, only one HDMI is enough to transmit the audio signals and images. Alternatively, several multi-functional connectors are stacked or combined together to form a multi-port connector. In this way, only one multi-port connector can allow a plurality of transmission lines of different functions to be inserted therein.

Although the above connectors reduce the number of transmission lines outside an electronic device to avoid the winding of the transmission lines, increase the transmission rate of data, and allow a plurality of transmission lines to be inserted therein, they still cannot provide additional functions for the electronic device.

SUMMARY OF THE INVENTION

In order to solve the drawbacks in prior art, the present invention is to provide a connecting device for combining a digital television tuner with a connector, thereby allowing a plurality of transmission lines of different functions to be inserted therein and watching digital television programs.

The present invention is to provide a connecting device having a built-in digital television tuner, comprising:

a base having a first port and a second port, a front end of the bottom of the first port having a stepped-like stopper and a rear end thereof having a plurality of troughs, inner walls of both sides of the first port being provided with two symmetrical grooves;

a digital television tuner provided in the first port and including a packaging body and a circuit board; the packaging body having an upper casing and a lower casing, one end of the upper casing extending to form two symmetrical rods, each of the two rods being provided with an insertion slot; a connecting portion between each rod and the upper casing being provided with a boss respectively, each of the bosses being provided transversely with a supporting block; the interior of the lower casing having an accommodating space, one end of the lower casing being provided with a protrusion, both sides of the protrusion being formed with a notch respectively, the upper casing being combined with the lower casing in such a manner that the two bosses of the upper casing are assembled in the notches on both sides of the protrusion; the bottom of the lower casing having a stopping strip, a stepped portion being formed between the stopping strip and the bottom of the protrusion, the stepped portion being engaged with the stopper at the front end of one port; the circuit board being assembled between the insertion slots and the supporting blocks, a front surface of the circuit board being electrically connected to a receiving antenna, and a back surface thereof being electrically connected to a digital television tuning circuit, one end of the circuit board being electrically connected with a plurality of conductive pins assembled in the troughs;

a cover plate, both sides thereof being provided with two symmetrical rails, the two rails sliding in the two grooves, the cover plate being assembled in the first port; and a connector disposed in the second port, the connector being a traditional multi-port connector, a stacked multi-port connector or a single-port connector.

With the digital television tuner being built in the connecting device, the internal structure of the electronic device or the design of the circuit board can be simplified, and the electronic device can be designed more easily.

DETAILED DESCRIPTION OF THE INVENTION

The characteristics and technical contents of the present invention will be described with reference to the accompanying drawings. However, the drawings are illustrative only but not used to limit the present invention.

Figure 1:
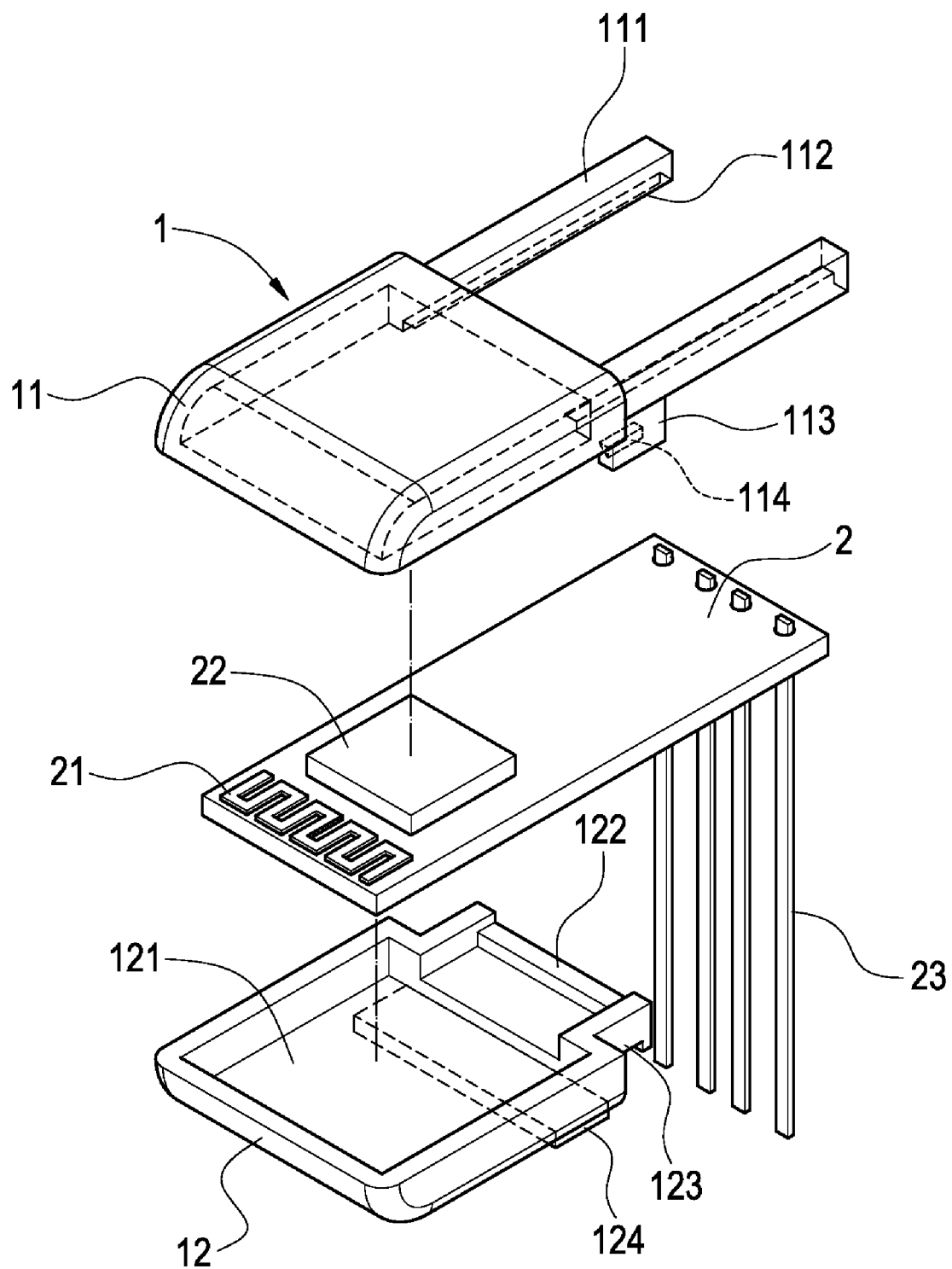
FIG. 1 is an exploded view showing the digital television tuner of the present invention.

Please refer to FIG. 1, which is an exploded view showing the digital television tuner of the present invention. As shown in this figure, the present invention provides a connecting device having a built-in digital television tuner. The digital television tuner of the connecting device includes a packaging body 1 and a circuit board 2.

The packaging body 1 has a transparent upper casing 11 and a transparent lower casing 12. One end of the upper casing 11 extends to form two symmetrical rods 111. Each of the two rods 111 is provided with an insertion slot 112. The connecting portion between each rod 111 and the upper casing 11 is provided with a boss 113. Each of the two bosses 113 is provided transversely with a supporting block 114. The circuit board 2 is inserted between the insertion slots 112 and the supporting blocks 114. Further, the interior of the lower casing 12 has an accommodating space 121. One end of the lower casing 12 is provided with a protrusion 122. Both sides of the protrusion 122 are formed with a notch 123 respectively. When the upper casing 11 is assembled with the lower casing 12, the electronic components of the circuit board 2 are received in the accommodating space 121 of the lower casing 2. The two bosses 113 of the upper casing 11 are assembled in the notches 123 on both sides of the protrusion 122 respectively. The bottom of the lower casing 11 has a stopping strip 124. A stepped portion is formed between the stopping strip 124 and the bottom of the protrusion 122. The stepped portion is inserted into a base (not shown) of the connecting device.

The front surface of the circuit board 2 is electrically connected to a receiving antenna 21, and the back surface thereof is electrically connected to a digital television tuning circuit 22. One end of the circuit board 2 is electrically connected with a plurality of conductive pins 23.

After the circuit board 2 is assembled with the packaging body 1, the antenna 21 and the digital television tuning circuit 22 of the circuit board 2 are received between the upper casing 11 and the lower casing 12.

Figure 2:
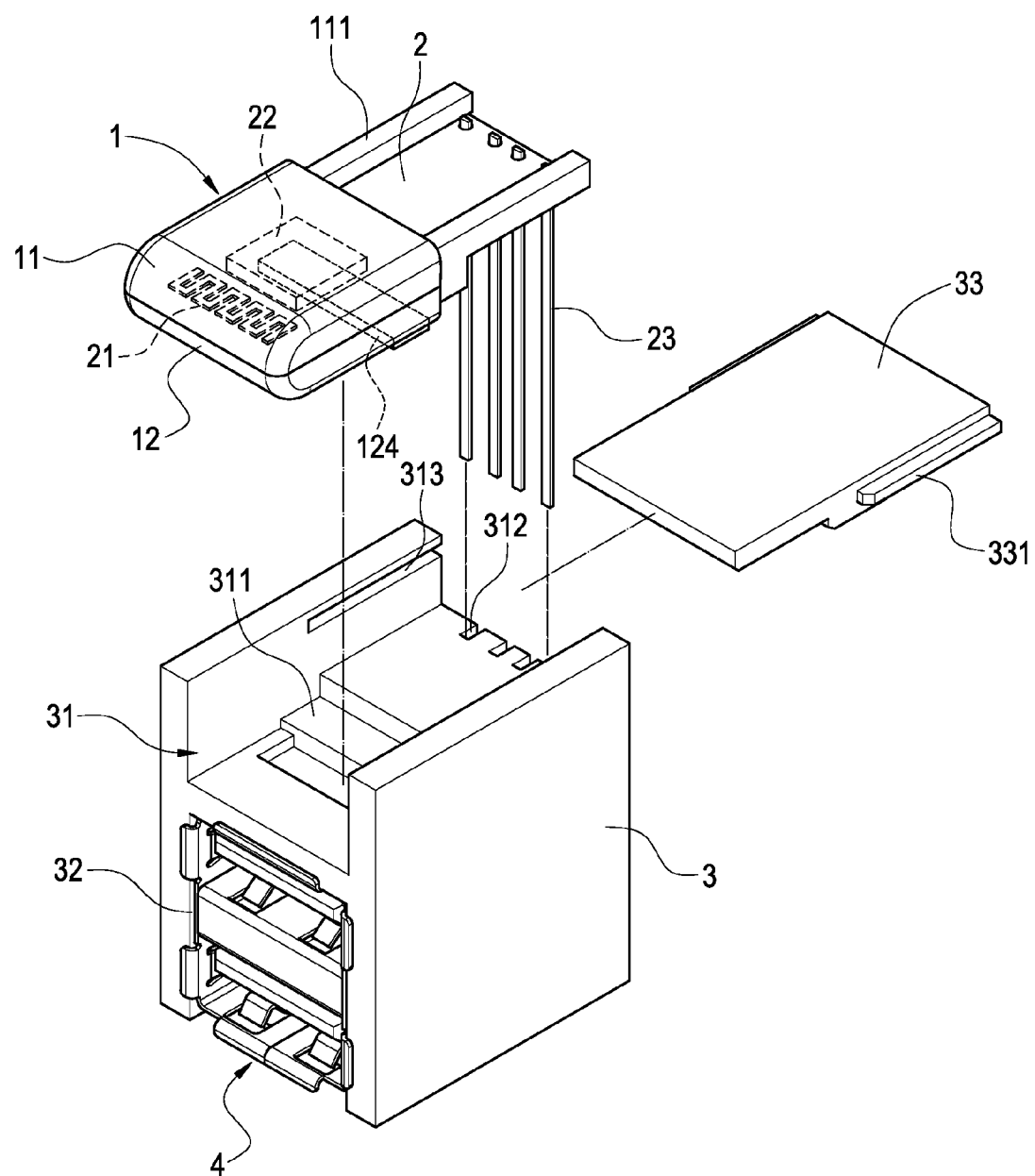
FIG. 2 is an exploded view showing the combination of the digital television tuner and the connecting device of the present invention.

Please refer to FIG. 2, which is an exploded view showing the combination of the digital television tuner and the connecting device of the present invention. As shown in this figure, the connecting device includes a base 3 formed into an H shape. The base 3 has a first port 31 and a second port 32. The front end of the bottom of the first port 31 has a stepped-like stopper 311, and the rear end thereof has a plurality of troughs 312. The stopper 311 is engaged with the stepped portion formed between the stopping strip 124 and the bottom of the protrusion 122 of the lower casing 12. The plurality of conductive pins 23 of the circuit board 2 is assembled in the troughs 312 respectively. Further, inner walls on both sides of the first port 31 are provided with two symmetrical grooves 313. Two symmetrical rails 331 provided on both sides of a cover plate 33 can slide in the grooves 313. The cover plate 33 is assembled in the first port 31 to cover the digital television tuner. At the same time, the upper casing 11 and the lower casing 12 protrude outside the first port 31.

Further, the connector 4 assembled in the second port 32 may be selected from one of a traditional multi-port connector, a stacked multi-port connector, and a single-port connector. The connector 4 may be any one of USB, HDMI, Displayport, PS/2, eSATA, micro-USB, MINI USB, and IEEE1394.

Figure 3:
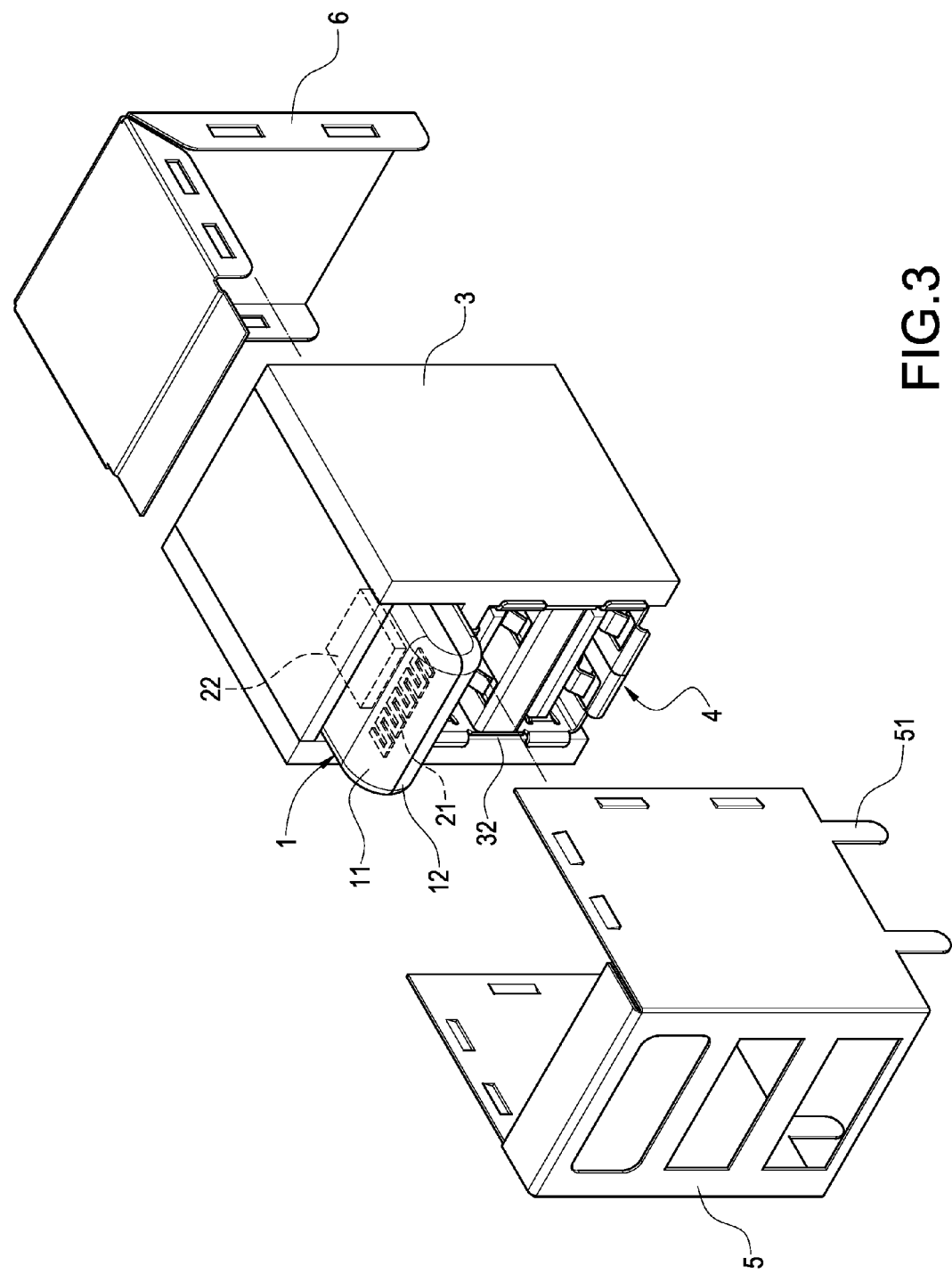
FIG. 3 is a schematic view showing the combination of the connecting device of the present invention and the metallic casing.
Figure 4:
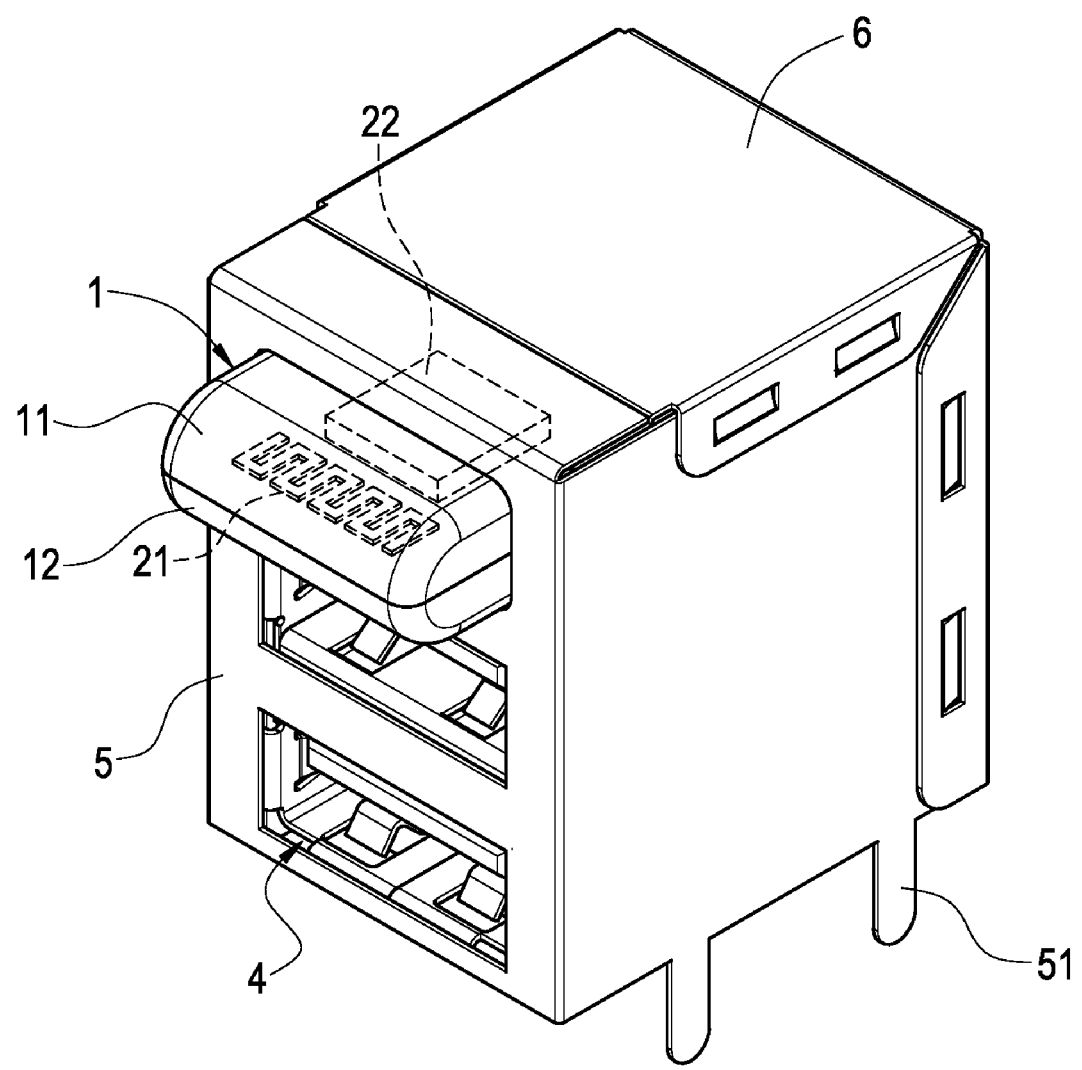
FIG. 4 is a schematic view showing the external appearance after the connecting device of the present invention is assembled with the metallic casing.

Please refer to FIGS. 3 and 4. FIG. 3 is a schematic view showing the combination of the connecting device of the present invention and the metallic casing, and FIG. 4 is a schematic view showing the external appearance after the connecting device of the present invention is assembled with the metallic casing. As shown in these figures, after the connecting device is assembled with the digital television tuner and the connector 4, the exterior of the base 3 is assembled with a metallic housing 5 and a metallic rear cover 6. The metallic housing 5 and the rear cover 6 can protect the digital television tuner and the connector 4 against the electro-magnetic interference. At the same time, fixing legs 51 of the metallic housing 5 allow the connecting device to be fixed to a main board in the electronic device (not shown).

Figure 5:
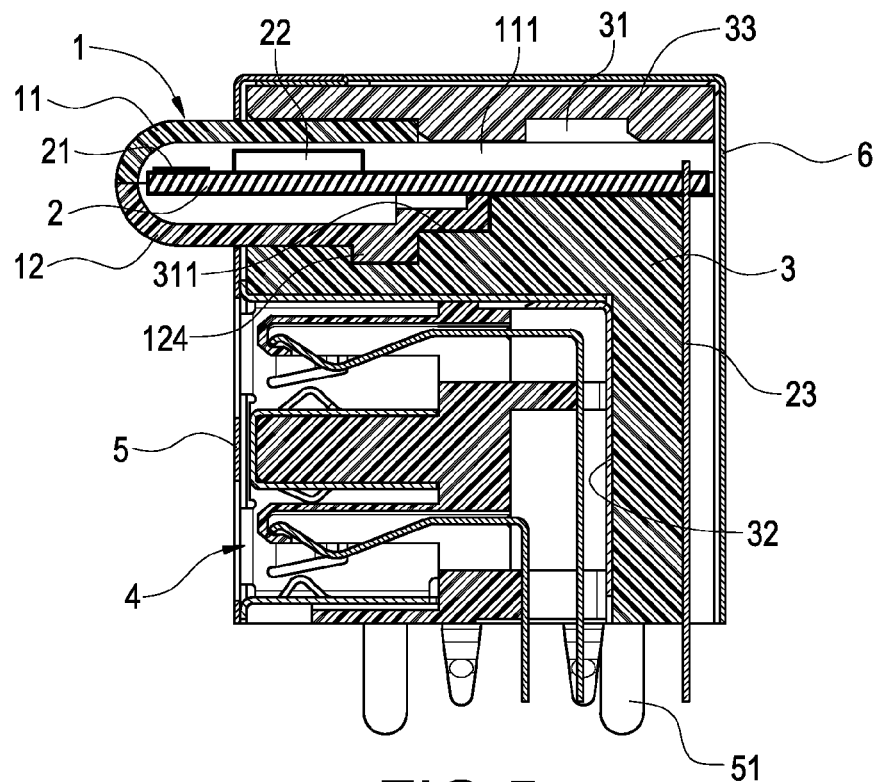
FIG. 5 is a cross-sectional view of FIG. 4.

Please refer to FIG. 5, which is a cross-sectional view of FIG. 4. As shown in this figure, after the connecting device is assembled with the digital television tuner and the connector 4, the digital television tuner in the first port 31 can receive digital television signals, while the second port 32 allows USB cables to be inserted therein. In the drawings, the connector 4 is exemplified as a USB connector. However, the connector 4 of the present invention is not limited to a USB connector.

Figure 6:
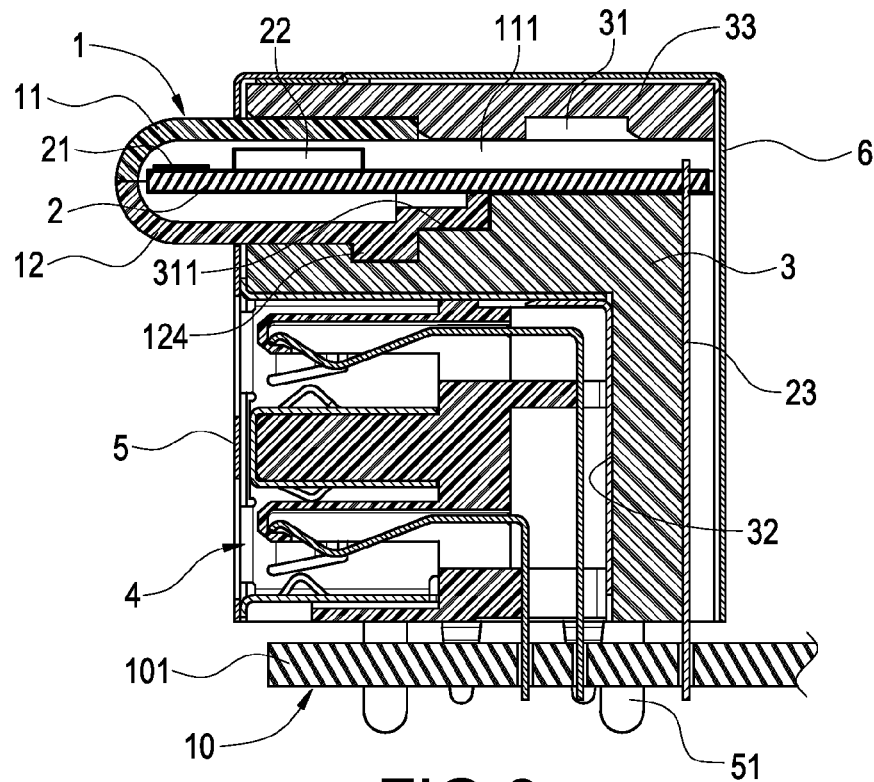
FIG. 6 is a schematic view showing the operating state of the present invention.
Figure 7:
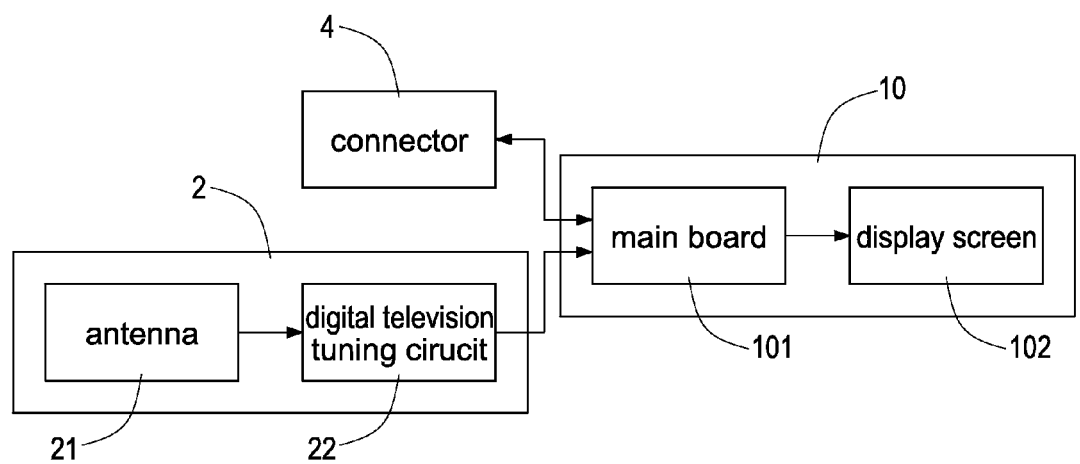
FIG. 7 is a block view showing the circuitry of the present invention.

Please refer to FIGS. 6 and 7. FIG. 6 is a schematic view showing the operating state of the present invention, and FIG. 7 is a block view showing the circuitry of the present invention. As shown in these figures, after the connecting device of the present invention is electrically connected with a main board 101 of an electronic device 10, the antenna 21 of the digital television tuner can receive digital television signals. The digital television signals are transmitted through the digital television tuning circuit 22 to the main board 101 and then played on a display screen 102. In this way, the user can watch digital television programs with the electronic device 10. Further, the connector 4 allows a plurality of transmission lines to be inserted therein, whereby multi-media signals and data such as advertisements, digital photos, digital images or the like can be inputted into the electronic device 10 and also played on the display screen 102.

Figure 8:
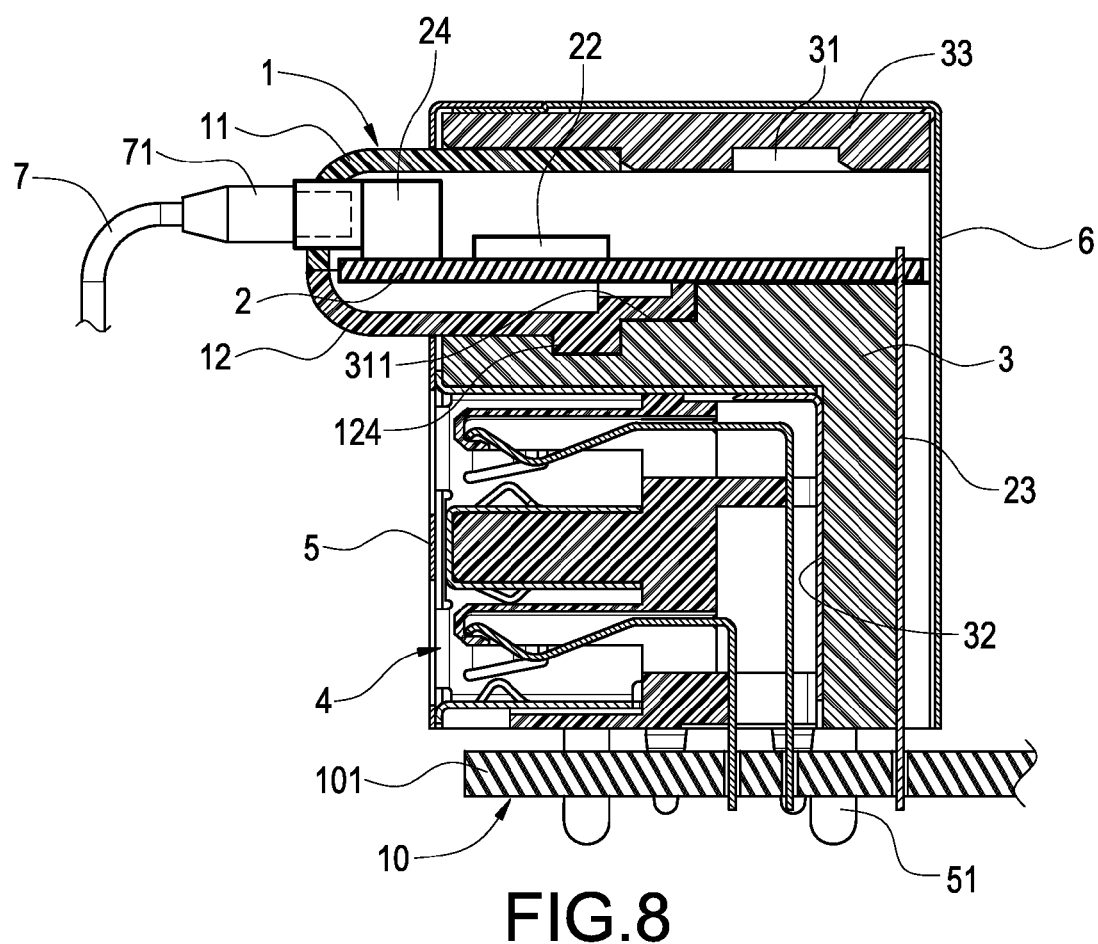
FIG. 8 is a view showing the second embodiment of the present invention.

Please refer to FIG. 8, which is a view showing the second embodiment of the present invention. As shown in this figure, in the present invention, the circuit board 2 is electrically connected with an antenna connector 24, which is a MMCX (Mini MCX) RF connector. The antenna connector 24 is exposed to the outside of the upper casing 11 for electrically connecting to a plug of an antenna cable 7. With this arrangement, the digital television tuning circuit 22 can receive signals with a better quality.

Due to the aforesaid design of the connecting device, the internal structure of the electronic device 10 or the design of the circuit board can be simplified, and the electronic device 10 can be designed more easily.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A connecting device having a built-in digital television tuner, adapted to be electrically connected to an electronic device for receiving digital television signals, the connecting device comprising:
    a base having a first port and a second port, a front end of the bottom of the first port having a stepped stopper, and its rear end having a plurality of troughs, inner walls on both sides of the first port being provided with two symmetrical grooves, the first port being assembled with a cover plate, both sides of the cover plate being provided with two symmetrical rails, the two rails sliding in the two grooves;
    a digital television tuner disposed in the first port, including:
        a circuit board comprising a receiving antenna for receiving digital television signals and a digital television tuning circuit for tuning the digital television signals received by the receiving antenna;
        a packaging body for packaging at least a part of the circuit board, the packaging body having a transparent upper casing and a transparent lower casing, one end of the upper casing extending to form two symmetrical rods, each of the two rods being provided with an insertion slot; a connecting portion between each rod and the upper casing being provided with a boss respectively, each of the two bosses being provided transversely with a supporting block; the interior of the lower casing having an accommodating space, one end of the lower casing having a protrusion, both sides of the protrusion being formed into notches to be assembled with the two bosses, the bottom of the lower casing having a stopping strip, a stepped portion being formed between the stopping strip and the bottom of the protrusion, the stepped portion being stopped by the stopper at a front end of one port;

wherein the circuit board is assembled between the insertion slots and the supporting blocks, a front surface of the circuit board is electrically connected to the receiving antenna, and a rear surface thereof is electrically connected to the digital television tuning circuit, one end of the circuit board is electrically connected with a plurality of conductive pins assembled in the troughs; and a connector disposed in the second port.

2. The connecting device according to claim 1, wherein the base is formed into an H shape.

3. The connecting device according to claim 2, wherein the connector is a multi-port connector having a plurality of ports.

4. The connecting device according to claim 2, wherein the connector is a stacked multi-port connector having a plurality of ports.

5. The connecting device according to claim 2, wherein the connector is a single-port connector.

6. The connecting device according to claim 5, wherein the connector is at least one of USB, HDMI, Displayport, PS/2, eSATA, micro-USB, MINI USB, and IEEE1394.

7. The connecting device according to claim 2, wherein an exterior of the base is assembled with a metallic housing and a metallic rear cover, the metallic housing has fixing legs.

8. The connecting device according to claim 2, wherein the digital television tuner comprises:

a packaging body having a transparent upper casing and a transparent lower casing, one end of the upper casing extending to form two symmetrical rods, each of the two rods being provided with an insertion slot; a connecting portion between each rod and the upper casing being provided with a boss respectively, each of the two bosses being provided transversely with a supporting block; the interior of the lower casing having an accommodating space, one end of the lower casing having a protrusion, both sides of the protrusion being formed into notched to be assembled with the two bosses, the bottom of the lower casing having a stopping strip, a stepped portion being formed between the stopping strip and the bottom of the protrusion, the stepped portion being stopped by the stopper at a front end of one port; and a circuit board assembled between the insertion slots and the supporting blocks, a front surface of the circuit board being electrically connected to an antenna connector, the antenna connector being exposed outside the upper casing, a rear surface of the circuit board being electrically connected to a digital television tuning circuit, one end of the circuit board being electrically connected with a plurality of conductive pins assembled in the troughs.

9. The connecting device according to claim 8, wherein the antenna connector is a MMCX (Mini MCX) RF connector.

10. The connecting device according to claim 9, wherein the antenna connector is electrically connected with a plug of an antenna cable.

* * * * *